(12) United States Patent
Fitzgerald

(10) Patent No.: US 6,382,635 B1
(45) Date of Patent: May 7, 2002

(54) DOUBLE WALLED BAFFLE

(75) Inventor: Gerald E. Fitzgerald, Clinton Township, MI (US)

(73) Assignee: Sika Corporation, Lyndhurst, NJ (US)

( * ) Notice: Subject to any disclaimer, the term of this patent is extended or adjusted under 35 U.S.C. 154(b) by 0 days.

(21) Appl. No.: 09/527,923

(22) Filed: Mar. 17, 2000

(51) Int. Cl.$^7$ .............................................. F16J 15/02
(52) U.S. Cl. ...................... 277/630; 277/645; 277/646; 428/63
(58) Field of Search .................. 428/63, 133, 139, 428/223; 277/630, 637, 645, 646, 650, 316

(56) References Cited

U.S. PATENT DOCUMENTS

| | | |
|---|---|---|
| 5,373,027 A | 12/1994 | Hanley et al. |
| 5,506,025 A | 4/1996 | Otto et al. |
| 5,631,027 A | 5/1997 | Takabatake |
| 5,642,914 A | 7/1997 | Takabatake |
| 5,649,400 A | 7/1997 | Miwa |
| 5,800,896 A | 9/1998 | Kobayashi |
| 5,806,915 A | 9/1998 | Takabatake |
| 5,904,024 A | 5/1999 | Miwa |
| 6,114,004 A | * 9/2000 | Cydzik ........................ 277/650 |

\* cited by examiner

*Primary Examiner*—Anthony Knight
*Assistant Examiner*—E Peavey
(74) *Attorney, Agent, or Firm*—Hovey Williams LLP

(57) ABSTRACT

An expandable baffle for sealing a cavity of an automobile is provided. The baffle includes a thermally expandable sealing material which has an expansion temperature similar to the temperatures achieved in specific stages of the automotive manufacturing processes (e.g., the paint bake stage). The inventive baffle further includes a support for the sealing material which maintains the material at the desired location within the cavity until thermal expansion. The support is formed of a material having a melting point higher than the thermal expansion temperature of the sealing material. In one embodiment, the support comprises a pair of solid, spaced-apart sidewalls that "bow" upon expansion of the sealing material. In an alternate embodiment, the sidewalls include a plurality of openings formed therein through which the sealing material flows during thermal expansion. The inventive baffles are useful for providing noise attenuation and for sealing the cavity from moisture and contaminants while providing a limited degree of structural reinforcement.

18 Claims, 2 Drawing Sheets

DOUBLE WALLED BAFFLE

BACKGROUND OF THE INVENTION

1. Field of the Invention

The present invention relates generally to thermally expandable baffles for sealing cavities in vehicles. More particularly, the inventive baffles include a quantity of thermally expandable sealing material and a support for the material which maintains the baffle in the desired location within the cavity until the material is thermally expanded so as to contact the walls forming the cavity, thus sealing the cavity.

2. Description of the Prior Art

During the fabrication of automobiles, trucks, and similar over-the-road vehicles, many body components present structural members having cavities that require sealing to prevent the entrance of moisture and contaminants which can cause corrosion of the body parts. It is also necessary to stabilize these members in order to attenuate noise that would otherwise be transmitted along the length or passage of the cavity. For example, the upright post structure or pillar of a vehicle body defining a portion of a respective window opening presents an elongated passage or cavity which can collect moisture and contaminants. Furthermore, this cavity can also transmit annoying sounds unless the cavity is at least partially filled with a sealant material. However, many of these cavities are irregular in shape or narrow in size, thus making them difficult to properly seal and baffle.

Many attempts have been made to seal these cavities, including spraying sealants into the cavity, introducing foam products into the cavity, and using fiberglass matting and the like. These methods each have drawbacks. For example, foaming in place presents a problem in that it is difficult to control where the foam travels upon its introduction into the cavity. Furthermore, it is often necessary to introduce an excess amount of foam into the cavity in order to ensure that the cavity is sufficiently sealed. Finally, foams will generally not adhere to the interior surfaces of the cavity walls if those surfaces contain even a small amount of oil.

Self-sustaining foam products, either with or without a non-foam support structure, have been introduced into structural member cavities in an attempt to seal the cavities. However, these methods generally result in the addition of excess weight to the structural member which is undesirable in most instances. Attempts have been made to utilize foam products which are lighter in weight or which do not use a support structure. However, these attempts have generally resulted in products which lack the necessary sealing and baffle abilities.

Finally, other types of foam or foamable products are tacky in nature, and thus cannot readily be positioned at the exact required location in the selected cavity. Such products also present unique packaging problems to the manufacturer and require special handling during installation.

SUMMARY OF THE INVENTION

The instant invention overcomes these problems by providing a thermally expandable baffle for sealing a cavity (such as one in a pillar or rail of a vehicle) at a predetermined location within the cavity.

In more detail, the baffle includes a quantity of thermally expandable sealing material and a support for maintaining the expandable material in the desired location within the cavity until the material is expanded. The sealing material is preferably a synthetic resin material and expands when subjected to temperatures achieved at specific points in the vehicle manufacturing process (e.g., during the paint bake stage of the process). Thus, the expansion temperature of the material should be at least about 149° C.

The support for the material is formed of a material having a melting point higher than the expansion temperature of the sealing material (such as nylon). Preferably, the support comprises a pair of spaced-apart walls defining a space therebetween for depositing of the sealing material therein. The walls are joined at one end by a common end wall, and are secured adjacent the other end by a connecter rod passing between and secured to the walls. The support also includes a fastener for attaching the baffle to a cavity wall. Preferably, the entire support is integrally constructed.

In use, the inventive baffle is placed within the cavity at the desired location by inserting the fastener into an opening on the cavity wall. Once the baffle is in position, various other manufacturing processes can be conducted without adversely affecting the baffle. When the vehicle is heated to the expansion temperature of the sealing material, the material will expand outwardly from the baffle towards the cavity walls, causing the expanded material to adhere to, and essentially seal, the cavity walls.

DETAILED DESCRIPTION OF THE PREFERRED EMBODIMENTS

Figure 1:
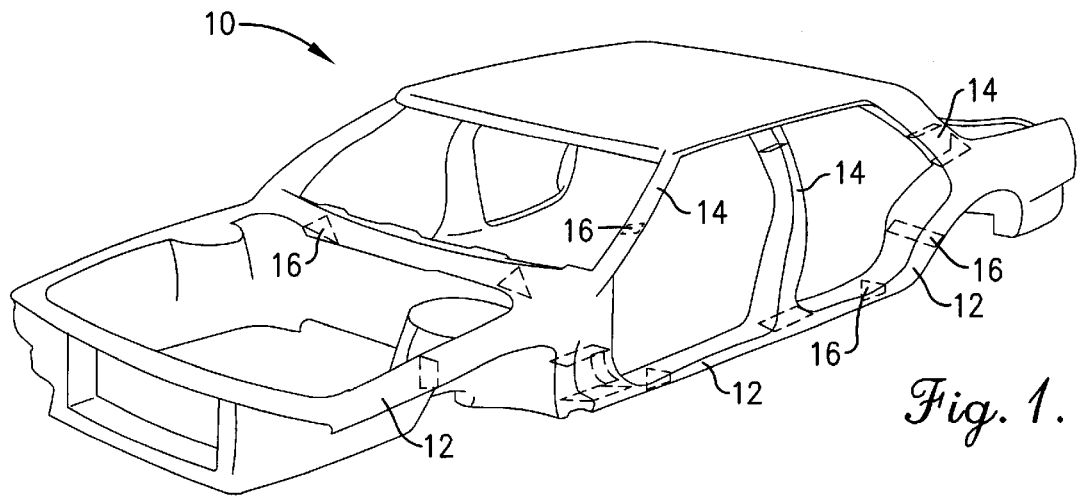
FIG. 1 is a perspective view of an automobile body, illustrating various pillars and rails within which the baffle apparatus of the present invention may be utilized.

Turning now to the Figures, FIG. 1 depicts an automobile 10 having a plurality of hollow rail sections 12 and pillars 14. Rail sections 12 and pillars 14 include a plurality of baffles 16 according to the invention and positioned therein so as to provide sound deadening as well as a limited degree of structural reinforcement.

Figure 2:
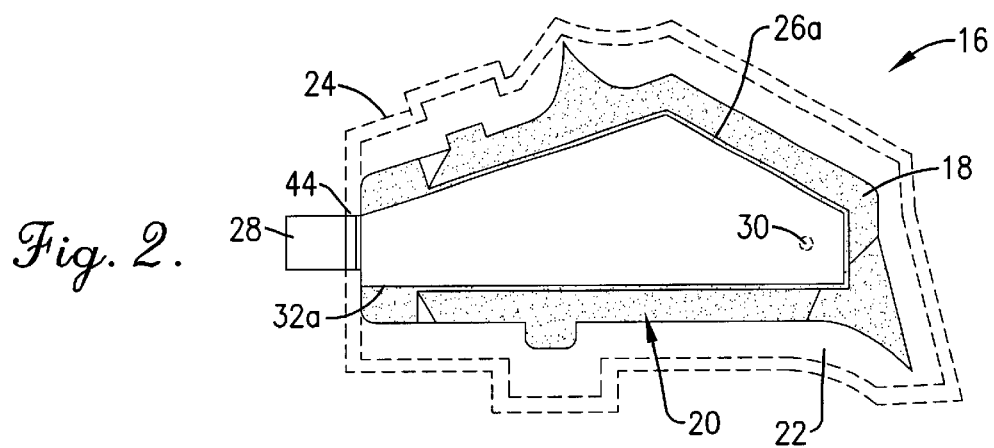
FIG. 2 is a perspective view of a baffle according to the invention.

An example of a preferred baffle 16 is shown in more detail in FIG. 2. In the illustrated embodiment, the baffle 16 includes a heat expandable, sealing material 18 and a support 20. The sealing material 18 is positioned within a cavity 22 defined by pillar or rail walls 24 of automobile 10. Material 18 is initially maintained in place by support 20.

Material 18 is formed of a dry, initially non-tacky material that becomes tacky upon expansion so that the sealing material adheres to the walls 24 when the baffle 16 is heated to the temperature at which the material expands. A preferred material is disclosed in U.S. Pat. No. 5,266,133 to Hanley et al., which is incorporated herein by reference. This material is sold under the name SIKALASTOMER 240 by Sika Corporation, in Madison Heights, Mich. However, those skilled in the art will appreciate that any other suitable sealing material may be employed in the inventive baffle 16, provided the material is able to sufficiently expand at conventional automobile bake temperatures (about 170–180° C.) so as to substantially seal the cross-section of the cavity 22 within which it is positioned.

Figure 3:
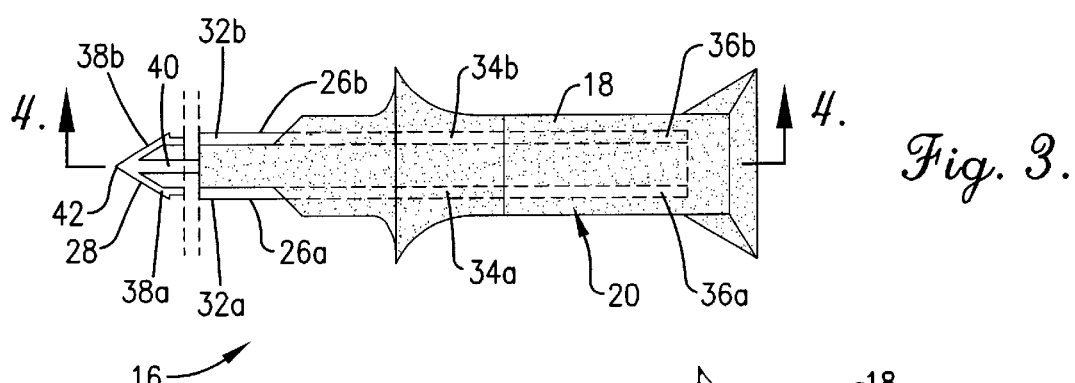
FIG. 3 is a top end view of the baffle of FIG. 2.
Figure 4:
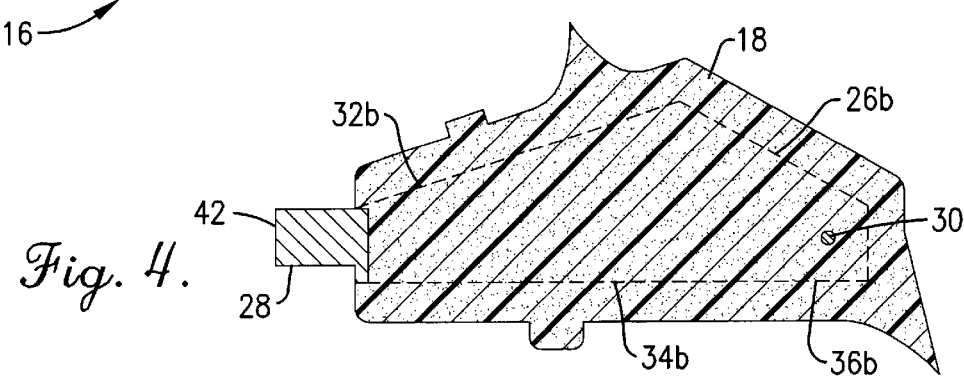
FIG. 4 is a cross sectional view taken along line 4—4 of the baffle in FIG. 3.
Figure 5:
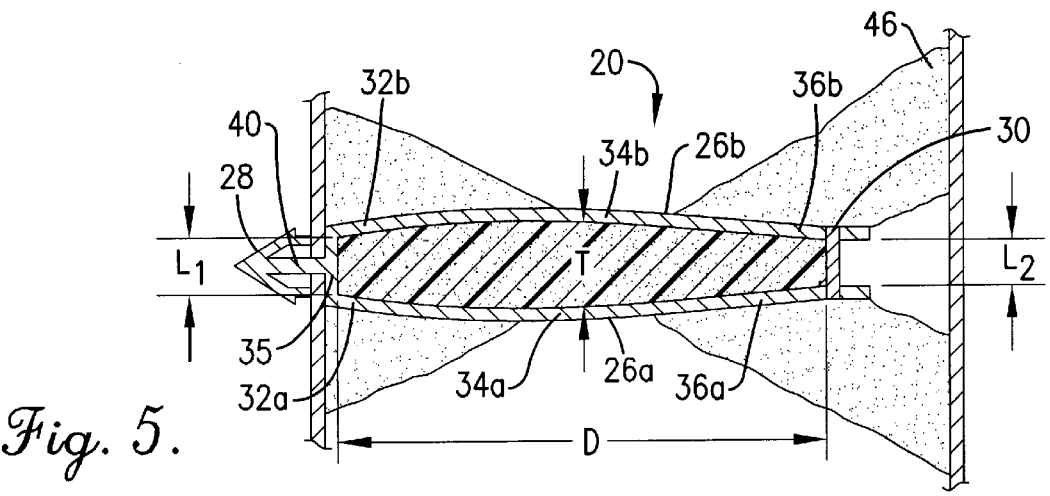
FIG. 5 is a horizontal cross sectional view of the baffle of FIG. 2 after thermal expansion of the sealing material.

Referring to FIGS. 3 and 4, support 20 comprises a pair of sidewalls 26a,b, a snap clip 28, and a preferably integrally formed connecter rod 30. Sidewalls 26a,b include respective forward ends 32a,b, midsections 34a,b, and rearward ends 36a,b. Sidewalls 26a,b are essentially parallel to one another prior to expansion of material 18 and are connected at forward ends 32a,b by a common endwall 35 (see FIG. 5) and at rearward ends 36a,b by the rod 30. Snap clip 28 is located adjacent forward ends 32a,b and comprises resilient legs 38a,b which converge with stem 40 to form an arrow-like tip 42.

The support 20 is formed of a material having a melting point that is higher than both the activation temperature of sealing material 18 and the bake temperature to which the automobile body is exposed. Preferably, the material from which support 20 is formed is pliable so that the baffle 16 may be subjected to bending forces without being cracked or permanently deformed. A particularly preferred material is a black, heat-stabilized lubricated 33% glass-reinforced 66 nylon having a heat deflection temperature at 1.8 MPa of 240° C., and a melting point of 262° C. One such material is marketed as NYLIND 51 HSL BK001 by DuPont. It will be appreciated, however, that other similar materials may be used, depending upon the desired physical characteristics of the final baffle.

The size and shape of support 20 is not critical, so long as support 20 is capable of fitting within the particular pillar or rail cavity. The size and shape of support 20 should be such that the sealing material 18 is maintained substantially in position prior to baking. Furthermore, the flow of material 18 should be sufficiently directed by the support 20 during expansion so that the expanded material contacts and adheres to the cavity walls 24.

In application, the baffle 16 is preferably provided to automobile manufacturers preassembled (i.e., with the non-expanded sealing material 18 preferably insert molded and disposed between support sidewalls 26a,b) for insertion into the cavity of the desired rail or pillar during construction of the automobile. Referring to FIGS. 2 and 3, one of the walls 24 forming the cavity 22 includes structure defining an opening 44 of sufficient size and shape to allow fastener 28 to be secured therein. That is, the tip 42 of fastener 28 is inserted into opening 44 under slight force, causing legs 38a,b to be reversibly biased towards stem 42. After the legs 38a,b have passed through opening 44, the legs 38a,b return to essentially their unbiased position, preventing the fastener 28 from being removed from opening 44 and securing the baffle 16 within the cavity 22 to essentially prevent movement of baffle 16. At this point in the assembly process, the sealing material 18 may or may not be in contact with some or all of the cavity walls 24, depending upon the size and shape into which the material 18 is molded.

Once the baffle 16 is positioned within the cavity 22, it remains in place until such time as the automobile body is exposed to an elevated temperature sufficient to activate the sealing material 18 and cause it to expand against the cavity walls 24. Any of a number of process or manufacturing steps may be carried out on the automobile body prior to baking without affecting the ability of the sealing pieces to expand when exposed to the activating temperature.

As the automobile body 10 is baked and the activation temperature of the sealing material 18 is reached, the material begins to expand in all directions. That is, the material 18 expands towards the respective peripheries of sidewalls 26a,b to form expanded material 46 (see FIG. 5). The percent expansion of the sealing material will generally be 150% or more, where the percent expansion is:

100×{[(the specific gravity of the sealing material before heating)−(the specific gravity of the sealing material after heating)]/(the specific gravity of the sealing material after heating)}.

With such a large percent expansion, the expanding force of the material 18 is such that the sidewalls 26a,b are pushed away from one another, so as to outwardly "bow" walls 26a,b at their respective midsections 34a,b. This bowing is important for obtaining a substantially improved baffle because, in the inventive baffle, the sealing material 18 is maintained on the support 20 so as to control the flow and expansion of the material 18 towards the cavity walls 24 and effectively seal the cavity 22, while simultaneously allowing the material 18 to expand longitudinally within the cavity 22 to provide a thicker, sound-deadening foam for improved noise attenuation. This combination of benefits has not been achieved by prior art baffle apparatuses.

The level of bowing achieved at midsections 34a,b relative to ends 32a,b and 36a,b is critical. That is, the expanded material 46 between sidewalls 26a,b has a thickness "T" at a distance of about ½ of "D" from endwall 35. Endwall 35 and rod 30 have respective lengths "$L_1$" and "$L_2$." The thickness T at a distance of about ½D from endwall 35 should be greater than the shorter of $L_1$ or $L_2$, and preferably T at a distance of about ½D from endwall 35 is greater than each of $L_1$ or $L_2$.

Figure 6:
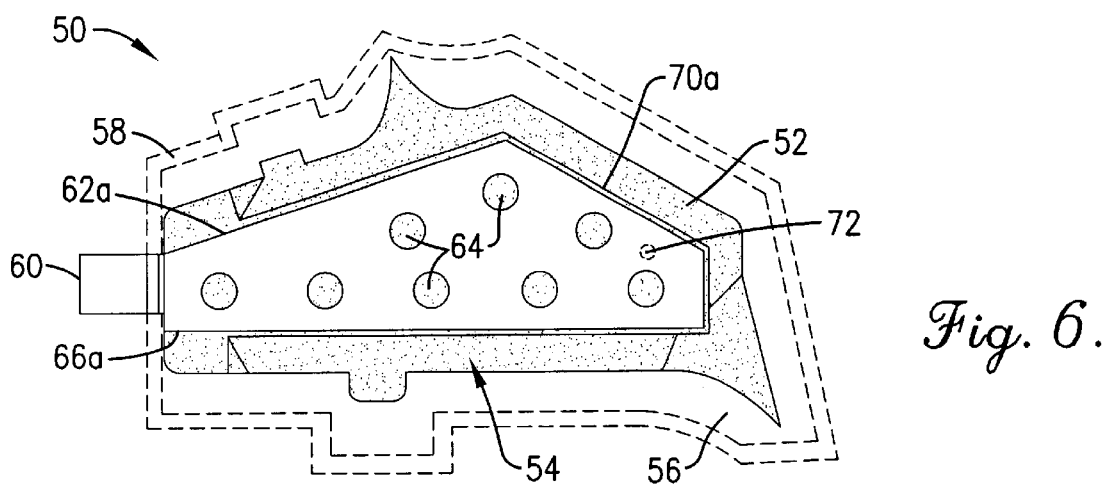
FIG. 6 is a perspective view of another embodiment of the inventive baffle.

Referring to FIG. 6, an alternate embodiment of the inventive baffle is illustrated. The baffle 50 is similar to baffle 16 discussed previously, in that baffle 50 comprises a heat expandable, sealing material 52 and a support 54. The sealing material 52 is positioned within a cavity 56 defined by pillar or rail walls 58. Material 52 is initially maintained in position by support 54.

Figure 7:
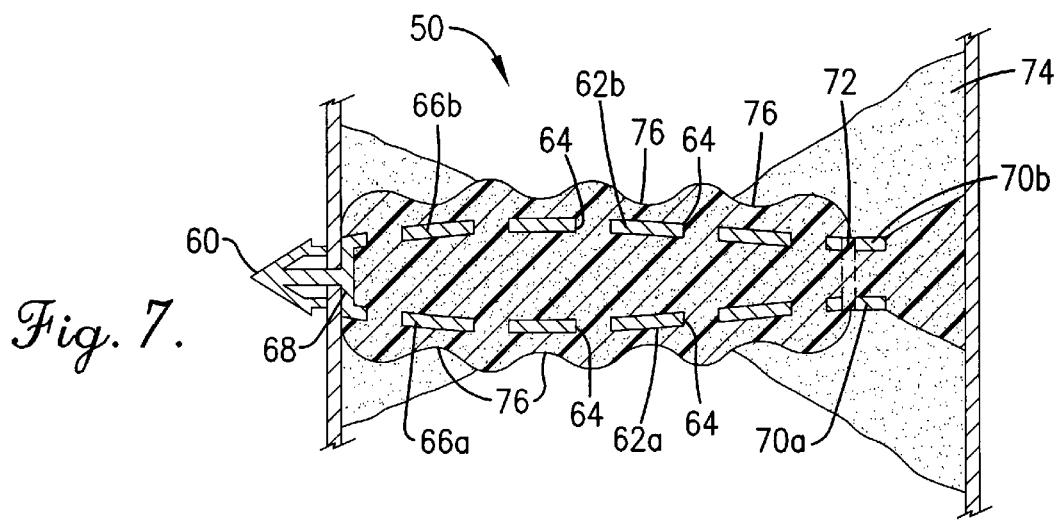
FIG. 7 is horizontal cross sectional view of the baffle of FIG. 6 after thermal expansion of the sealing material.

Material 52 and support 54 can be formed of the same materials discussed above with respect to baffle 16. Furthermore, support 54 includes a fastener 60 similar to fastener 28 of support 20. However, in the instant embodiment, support 54 includes a pair of sidewalls 62a,b having a plurality of openings 64 formed therein. The sidewalls 62a,b are connected at forward ends 66a,b by a common endwall 68 (see FIG. 7) and at rearward ends 70a,b by a connecter rod 72.

In use, the baffle 50 is installed within the cavity 56 of the automobile pillar or rail in the same manner as baffle 16. However, upon heating of the automobile to the thermal expansion temperatures (i.e., at least about 149° C.) of material 52, the material 52 will expand through openings 64 as well as outwardly toward walls 58 to form expanded material 74. Furthermore, the material 52 which flows through the various openings 64 will also flow in a direction parallel to the sidewalls 62a,b so as to contact and bind with material 52 which has flowed from other openings 64, forming mechanical connections 76 along the respective outer surfaces of sidewalls 62a,b between the openings 64. This flow pattern results in a thicker, sound-deadening foam within the cavity 56, leading to improved noise attenuation.

In order to ensure that the appropriate quantity of material flows through openings 64, the number of openings 64 is limited. That is, the combined surface area of all openings 64 on a given sidewall 62a,b should occupy only from about 5–40%, and preferably from about 15–30%, of the total surface area of the particular sidewall 62a,b. Furthermore, the openings 64 should be substantially evenly dispersed across the sidewalls 62a,b to provide a baffle having an essentially even thickness longitudinally within the cavity 56. This uniform opening placement, combined with the limited number of openings 64, ensures that the flow of the foaming material is adequately directed outward, towards the cavity walls 58 so as to properly seal the cavity 56. This embodiment is particularly useful in applications where it is desirable to minimize the bowing of sidewalls 62a,b. Those skilled in the art will appreciate that the use of openings 64 can provide advantages in other applications as well.

Although the present invention has been described with reference to the preferred embodiments illustrated in the accompanying figures, it is noted that substitutions may be made and equivalents employed without departing from the scope of the invention. For example, although the preferred embodiment is illustrated in connection with applications in pillars or rails of an automobile body, the inventive baffles may be employed in other vehicles as well (e.g., sport utility vehicles, pick-up trucks, etc.). Furthermore, while the fasteners 28 and 60 are located at one end of the illustrated baffles, the location and number of fasteners can be varied as is necessary for the particular application.

I claim:

1. An expandable baffle for sealing a cavity of a vehicle body, said baffle comprising:
   an expansible material support comprising:
      a pair of pliable, opposed spaced-apart walls having respective, adjacent first and second ends and defining a space therebetween, the first ends of the walls being remotely spaced from the second ends;
      a rod securing said walls to one another at a location adjacent said first ends and remote from the second ends of the walls; and
      a rod securing said walls to one another at a location adjacent said first ends and remote from the second ends of the walls; and
      a fastener for securing the baffle within the cavity, said fastener being adjacent and interconnecting said second ends, said support being substantially free of connection between said pair of walls intermediate said rod and said fastener; and
   a synthetic resin sealing material operably coupled with and supported by said support, said sealing material being expandable when heated to an expansion temperature of at least about 149° C. such that bowing of the walls of said support occurs in convex relationship to one another intermediate said rod and said fastener, said support being formed of a material having a melting point higher than the expansion temperature of said sealing material.

2. The baffle of claim 1, wherein said walls are essentially parallel.

3. The baffle of claim 1, wherein said support is formed of nylon.

4. The baffle of claim 1, wherein said sealing material comprises an ethylene-α,β ethylenically unsaturated carboxylic acid copolymer, a blowing agent, and a tackifier.

5. The baffle of claim 4, wherein said sealing material further comprises an additive polymer and a cross-linking agent.

6. The baffle of claim 1, wherein each of the walls includes structure defining a plurality of openings therethrough positioned between the rod and the fastener for allowing sealing material to expand through said openings when heated to said expansion temperature.

7. The baffle of claim 6, wherein the combined surface area of said openings comprises from about 5–40% of the total surface area of the respective wall.

8. A noise-attenuated structural member comprising:
   a structural member defying a cavity; and
   a baffle positioned in said cavity, said baffle comprising:
      an expansible material support comprising:
         a pair of pliable, opposed spaced-apart walls having respective, adjacent first and second ends and defining a space therebetween, the first ends of the walls being remotely spaced from the second ends of the walls;
         a rod securing said walls to one another at a location adjacent said first ends and remote from the second ends of the walls; and
         a fastener for securing the baffle within the cavity, said fastener being adjacent and interconnecting said second ends, said support being substantially free of connection between said pair of walls intermediate said rod and said fastener; and
      an expanded, synthetic resin sealing material operably coupled with and supported by said support, said expanded material bowing said pair of walls in convex relationship to one another to increase the distance therebetween intermediate said rod and said fastener and contacting said structural member so as to substantially seal said cavity.

9. The member of claim 8, wherein each of said walls has a generally arcuate horizontal cross section.

10. The member of claim 8, wherein said support is formed of nylon.

11. The member of claim 8, wherein said sealing material comprises an ethylene-α,β ethylenically unsaturated carboxylic acid copolymer, a blowing agent, and a tackifier.

12. The member of claim 11, wherein said sealing material further comprises an additive polymer and a cross-linking agent.

13. The member of claim 8, wherein each of said walls includes structure defining a plurality of openings therethrough positioned between the rod and the fastener and at least a portion of said expanded material is expanded through a plurality of said openings.

14. The member of claim 13, wherein the combined surface area of said openings comprises from about 5–40% of the total surface area of the respective wall.

15. The member of claim 8, wherein said structural member is a vehicle rail.

16. The member of claim 8, wherein said structural member is a vehicle pillar.

17. A baffle for sealing a cavity of a vehicle body, said baffle comprising:
   an expansible material support comprising:
      a pair of pliable, opposed spaced-apart walls defining a space therebetween and having respective, adjacent first and second ends, the first ends of the walls being remotely spaced from the second ends of the walls;
      a rod securing said spaced-apart walls to one another at a location adjacent said first ends and remote from the second ends of the walls; and
      an endwall joining said spaced-apart walls adjacent said second ends, said support being substantially free of connection between said pair of walls intermediate said rod and said endwall; and
   a thermally expanded sealing material operably coupled with and supported by said support, said thermally expanded material bowing said pair of walls in convex relationship to one another to increase the distance therebetween intermediate said rod and said fastener and contacting said structural member so as to substantially seal said cavity.

said endwall and said rod having respective lengths $L_1$ and $L_2$ and being separated by a distance D, said material being sufficiently expanded so that at a distance of about ½D from said endwall, the thickness of the expanded material is greater than the shorter of $L_1$ and $L_2$.

18. The baffle of claim 17, wherein the thickness of said expanded material is greater than each of $L_1$ and $L_2$.

* * * * *

UNITED STATES PATENT AND TRADEMARK OFFICE
CERTIFICATE OF CORRECTION

PATENT NO.    : 6,382,635 B1                                                          Page 1 of 1
DATED         : May 7, 2002
INVENTOR(S)   : Fitzgerald, Gerald E.

It is certified that error appears in the above-identified patent and that said Letters Patent is hereby corrected as shown below:

Column 5,
Lines 33-35, please delete "a rod securing said walls to one another at a location adjacent said first ends and remote from the second ends of the walls; and"

Column 6,
Line 5, please delete "defying" and substitute therefor -- defining --.

Signed and Sealed this

Twenty-fourth Day of December, 2002

JAMES E. ROGAN
*Director of the United States Patent and Trademark Office*